R. B. EVANS.
Potato-Diggers.

No. 146,174. Patented Jan. 6, 1874.

Witnesses:
Inventor:
Per
Attorneys.

UNITED STATES PATENT OFFICE.

RICHARD B. EVANS, OF CONNELLSVILLE, PENNSYLVANIA.

IMPROVEMENT IN POTATO-DIGGERS.

Specification forming part of Letters Patent No. 146,174, dated January 6, 1874; application filed July 26, 1873.

*To all whom it may concern:*

Figure 1:
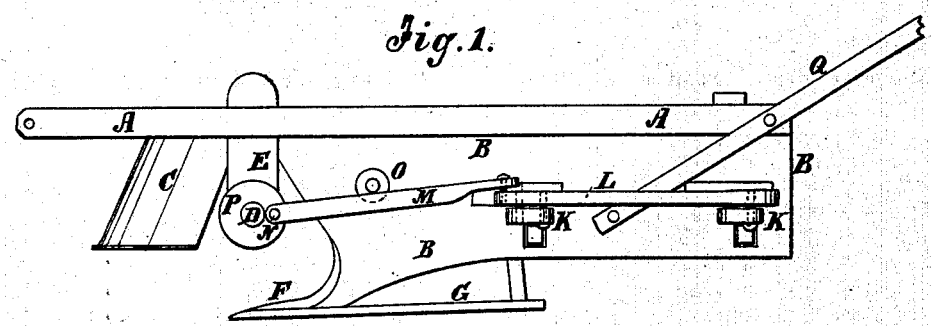
Figure 2:
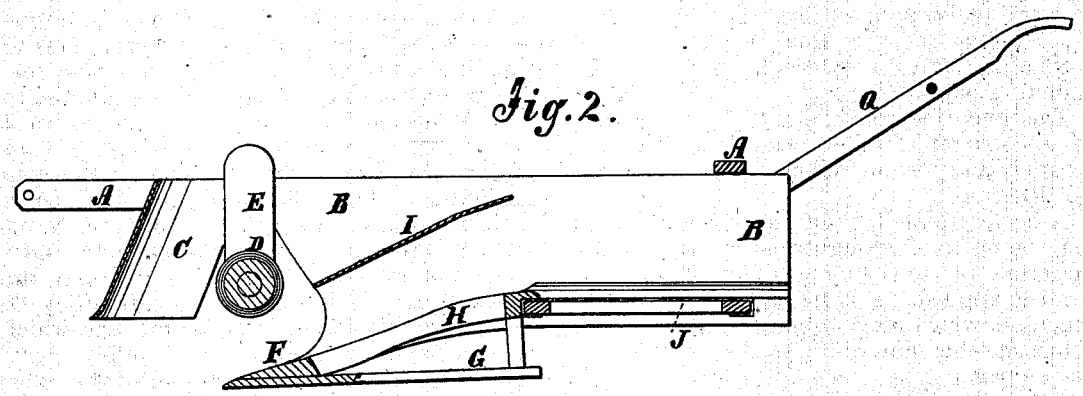
Figure 3:
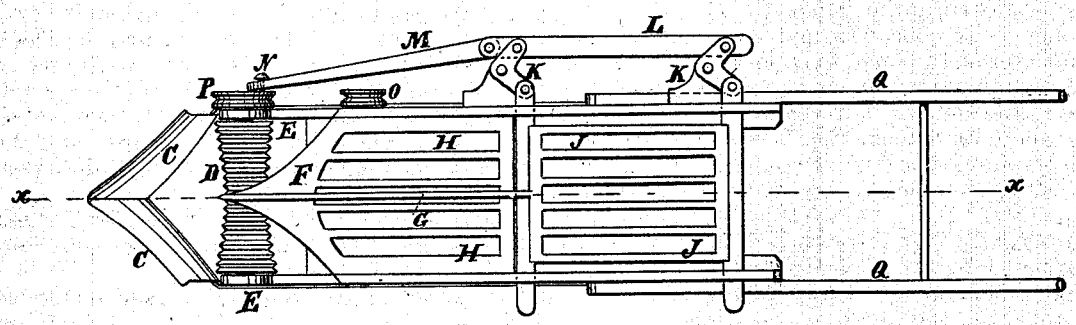

Be it known that I, RICHARD B. EVANS, of Connellsville, in the county of Fayette and State of Pennsylvania, have invented a new and useful Improvement in Potato-Harvesters, of which the following is a specification:

Figure 1 is a side view of my improved machine. Fig. 2 is a vertical longitudinal section of the same, taken through the line $x\ x$, Fig. 3. Fig. 3 is a bottom view of the same.

Similar letters of reference indicate corresponding parts.

The invention consists in the arrangement of a corrugated roller, with reference to a scraper and plow or soil-elevator, as hereinafter described.

A is the frame-work of the machine, which may be made of wrought-iron or other similar material, and to the forward end of which the draft is applied. D is the casing or box of the machine, which may be made of sheet-iron or other suitable material. To the forward part of the frame A is attached an angular sheet-metal scraper, C, having a cutter formed upon or attached to its lower edge, and which is designed to clear off the weeds, stalks, grass, &c. The scraper C should be adjustably attached to the frame A, so that it may be raised or lowered, as may be desired. A little in the rear of scraper C is placed a roller, D, the journals of which revolve in bearings in the lower ends of the uprights E, which are attached to the frame A. The face of the roller D is concaved, and has ring corrugations formed upon it, to make it more effective in breaking up any clods or lumps that may be in the soil. F is the plow or share, which is made V-shaped, and is securely attached to the frame-work of the machine. The plow F is made with a horizontal foot, G, extending to the rearward to give steadiness to the machine. H is a stationary rack or screen attached to the frame-work of the machine, and which inclines upward to guide the potatoes, and the soil that may adhere to them, to the movable screen or shaker. I is an upwardly-inclined plate attached to the frame-work of the machine, above the stationary screen H, to prevent the soil and potatoes from rolling forward instead of passing back to the shaker. J is the movable screen or shaker, which is placed in the rear of the stationary screen H, and which, by its motion, is designed to free the potatoes from any soil that may adhere to them, and which has not dropped through the slots of the stationary screen H. The end bars of the screen J project through holes in the sides of machine, and to said ends, upon one or both sides of the machine, are pivoted the ends of the angle-levers K, which are pivoted at their angles to supports attached to the side of the machine. The other arms of the lever K are pivoted to and connected by a bar, L, to the forward end of which, or to the arm of the forward lever K, is pivoted the rear end of the connecting-bar M, the forward end of which is pivoted to a short crank or crank-pin, N, attached to the end of the roller D. If a more rapid motion of the shaker J is required, the crank N may be attached to a small pulley, O, pivoted to the side of the machine, and which is connected by a band with a pulley, P, attached to or formed upon the end of the roller D. Q are the handles, which are attached to the sides of the machine, and which are connected and held in their proper relative position by a cross-bar.

It will be seen that, in practical operation, the scraper C removes the portion of the earth which covers the potatoes, leaving the corrugated roller to act with good effect upon the smooth surface thus formed, and the double or V-shaped plow, following immediately after, is thus enabled to elevate the earth in which the potatoes lie embedded without injury to them, and with comparatively small expenditure of force. The roller also acts as a colter-wheel, in respect both to the scraper and the plow, governing the depth to which they penetrate the soil.

Having thus described my invention, I claim as new and desire to secure by Letters Patent—

The corrugated roller D, suspended from the beam A, and combined with the scraper C and plow or soil-elevator F, as shown and described, for the purpose specified.

RICHARD B. EVANS.

Witnesses:
JOHN COULSON,
JOHN CUMMINGS.